United States Patent [19]
VonBargen et al.

[11] Patent Number: 6,031,608
[45] Date of Patent: Feb. 29, 2000

[54] SPECTROSCOPIC INSTRUMENT WITH OFFSET GRATING TO IMPROVE FOCUS

[75] Inventors: Kenneth P. VonBargen, College Park; Karl H. Norris, Beltsville, both of Md.

[73] Assignee: Foss NIRSystems, Inc., Silver Spring, Md.

[21] Appl. No.: 09/146,424

[22] Filed: Sep. 3, 1998

[51] Int. Cl.[7] .................................................. G01J 3/18
[52] U.S. Cl. ........................ 356/308; 356/328; 356/334
[58] Field of Search ................................... 356/308, 305, 356/326, 328, 332, 334, 319

[56] References Cited

U.S. PATENT DOCUMENTS

| | | | |
|---|---|---|---|
| H1152 | 3/1993 | Korendyke | 356/328 |
| 3,658,424 | 4/1972 | Elliott | 356/305 |
| 4,264,205 | 4/1981 | Landa | 356/326 |
| 4,436,393 | 3/1984 | Vanderwerf | 353/38 |
| 5,015,069 | 5/1991 | Bryan et al. | 356/319 |
| 5,355,188 | 10/1994 | Biles et al. | 353/69 |
| 5,748,310 | 5/1998 | Fujiyoshi | 356/334 |

*Primary Examiner*—F. L. Evans
*Attorney, Agent, or Firm*—Lane, Aitken & McCann

[57] ABSTRACT

In a spectroscopic instrument having a spherical grating to disperse incident light into a spectrum, the grating is oscillated on axis to scan the light passing through an exit slit through the spectrum or a portion of the spectrum. The axis of rotation of the grating is shifted to be displaced from tangent to the center of the spherical grating so that the light passing through the exit slit is substantially focused throughout the spectrum scanned by the instrument. The grating is mounted in the holder to shift the center of gravity of the grating and the holder to be on the axis on which the grating is pivoted.

17 Claims, 3 Drawing Sheets

SPECTROSCOPIC INSTRUMENT WITH OFFSET GRATING TO IMPROVE FOCUS

BACKGROUND OF THE INVENTION

This invention relates to a spectroscopic analyzing instrument employing a holographic spherical grating to disperse incident light into its spectrum.

Spectroscopic instruments are used to analyze materials and color by dispersing light into narrow bandwidths and using these narrow bandwidths to measure reflectivity or transmissivity of a sample. Spectroscopic instruments operating in the near infrared range have been particularly useful in analyzing materials not only to determine constituents of the material and identify the material, but also to analyze physical properties of the material.

Modern spectroscopic instruments employ a holographic spherical grating to disperse incident light into its spectrum. The grating directs the spectrum toward an exit slit through which a narrow band of the dispersed spectrum passes. By rotating the grating on a selected axis, the center wavelength of the light passing through the exit slit is scanned through the spectrum. In typical instruments, the grating is oscillated at a high speed to enable a rapid analysis of materials.

A holographic spherical grating tends to focus the dispersed spectrum and it is desired to position the grating relative to the exit slit to focus the light at the exit slit to provide a minimum bandwidth of the light passing through the exit slit.

In prior art systems employing a spherical grating, the grating is positioned to focus the light passing through the exit slit at one wavelength of the dispersed spectrum. The arrangement resulted in achieving an optimum focus at the selected wavelength but not an optimum focus throughout the spectrum.

SUMMARY OF THE PRESENT INVENTION

The purpose of the present invention is to achieve a substantial improvement in focus of the light passing through the exit slit throughout the entire range of the spectrum which passes through the exit slit as the grating is oscillated thereby normalizing the bandwidth passing through the exit slit throughout the entire range of the spectrum which is scanned by the instrument. In accordance with the invention, the axis on which the spherical grating is oscillated is shifted from its normal position tangent to the center of the spherical grating to a position wherein the light at the exit slit will remain substantially focused throughout the entire spectrum. As a result a narrower bandwidth is achieved for the light passing through the exit slit throughout the entire spectrum enabling more accurate analysis and measurement to made by the instrument.

In accordance with the invention, a holder is provided to mount the grating on an axle by which the grating is oscillated. The holder is designed to shift the center of gravity of the structure of the grating and the holder to be centered on the axis on which the grating is pivoted in its oscillation.

DESCRIPTION OF THE PREFERRED EMBODIMENT

Figure 1:
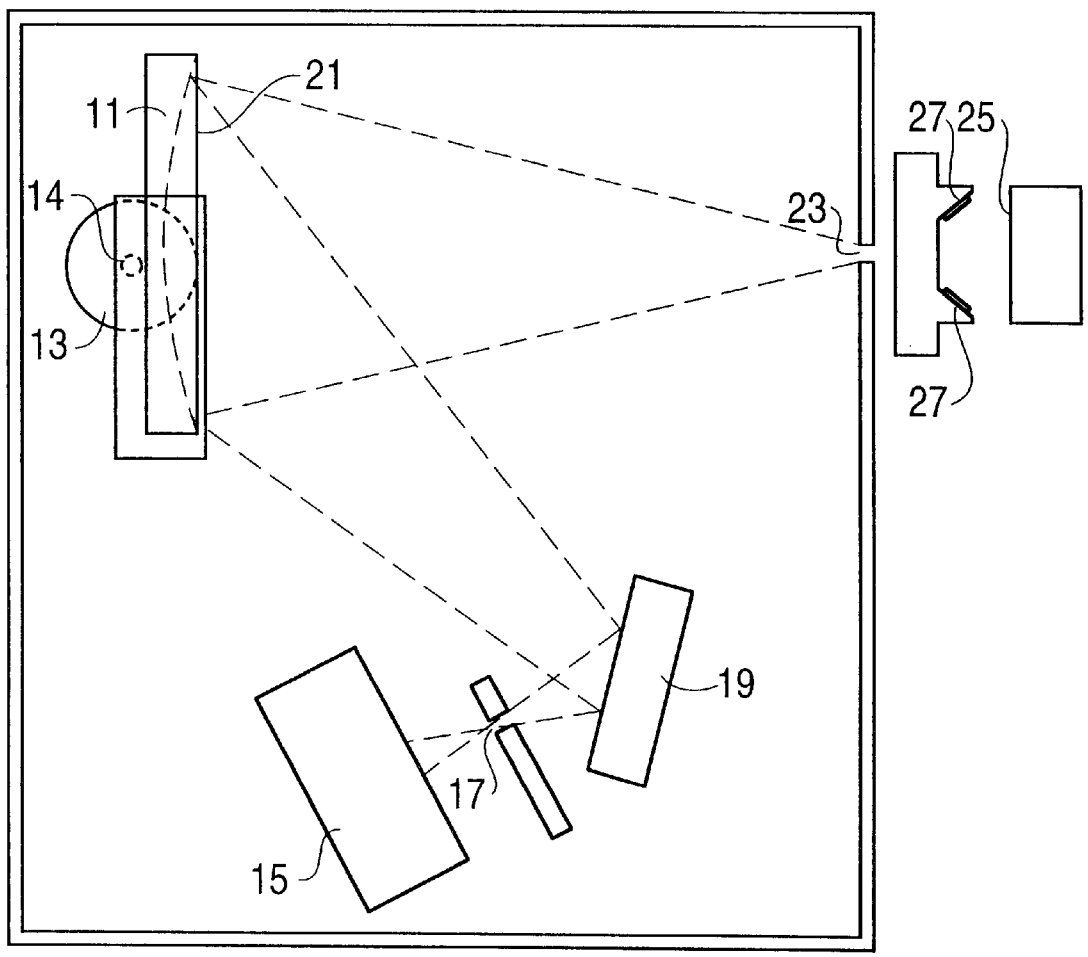
FIG. 1 schematically illustrates a spectroscopic instrument in which the system of the present invention is incorporated.

The present invention is incorporated in a grating system such as that illustrated in FIG. 1. As shown in FIG. 1, a grating 11 is pivotally mounted to be oscillated by a motor 13 and is directly driven by the axle 14 of the motor 13. The grating is oscillated at a high speed through an angle of 44 degrees. Light from a source 15 is directed through an entrance slit 17 onto a flat mirror 19 which redirects the light to illuminate the entire spherical holographic grating surface 21 of the grating. The grating surface 21 disperses the light into its spectrum and the dispersed light is reflected from the grating towards an exit slit 23. A narrow wavelength band of the dispersed spectrum will pass through the exit slit 23 to irradiate a sample or standard 25, which will diffusely reflect the incident light to be detected by photodetectors 27. The specific embodiment shown in FIG. 1 is an arrangement to analyze a sample by reflectance. However, the instrument may be readily adapted to make transmission measurements simply by arranging a sample to have the light transmitted through the sample and arranging the photodetectors to receive light transmitted through the transmissive sample. Alternatively, the broad spectrum of light may be diffusely reflected from or passed through the sample and the light reflected from or transmitted through sample is then directed to illuminate the grating.

In the grating systems of the prior art, the axis on which the grating is oscillated is tangent to the center of the spherical grating surface 21 of the holographic grating. As the grating oscillates, the narrow bandwidth of light transmitted through the exit slit will be scanned through a spectrum. For a visible-infrared system, the wavelength is typically scanned from 400 nanometers to 2500 nanometers. The grating is positioned to focus the narrow bandwidth of light passing through the exit slit at one particular center wavelength. A typical near infrared spectroscopic instrument positions the grating in focus at the extreme oscillation position at which 2500 nanometers passes through the exit slit and a good focus is not achieved at other positions of the grating as it oscillates.

Figure 2:
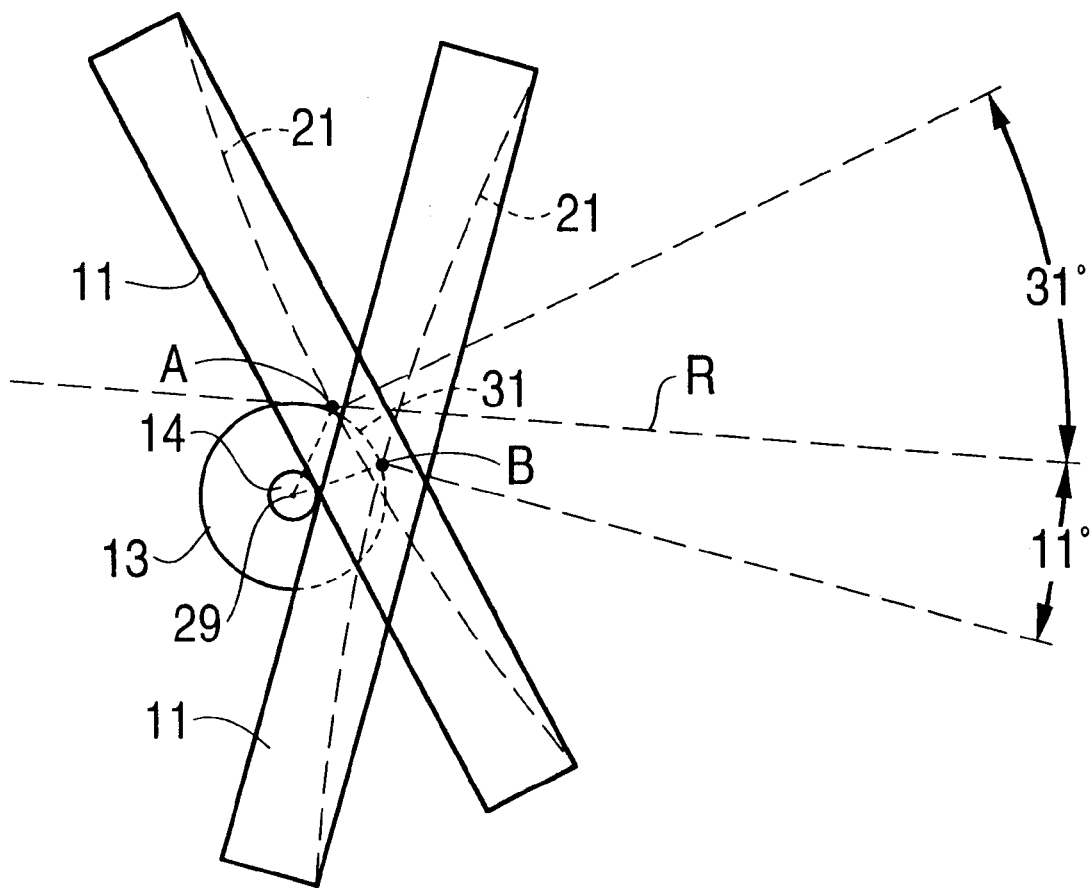
FIG. 2 is a schematic illustration showing how the axis of rotation is a shifted to achieve substantial focus throughout the entire range of the spectrum which is transmitted through the exit slit.
Figure 3:
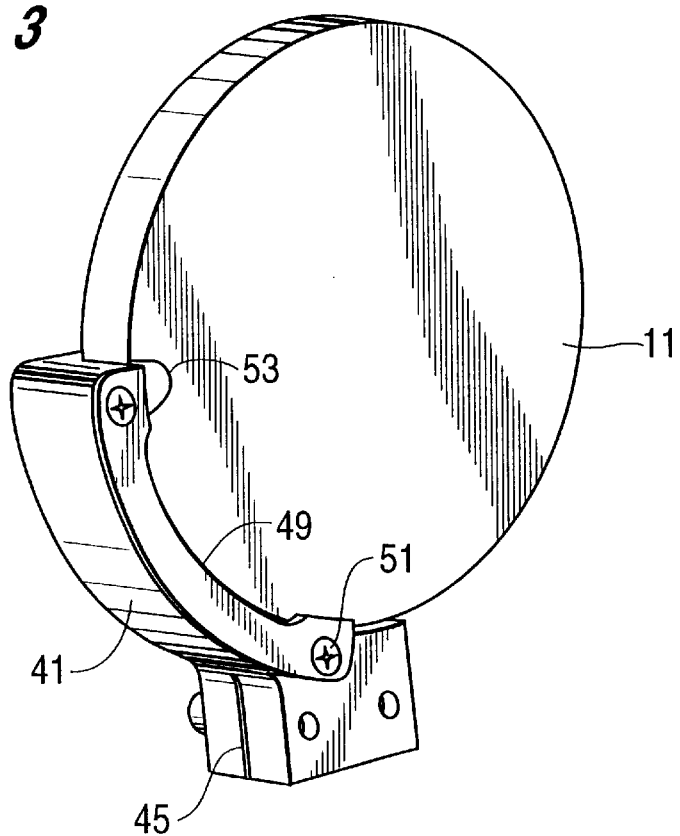
FIGS. 3 and 4 are perspective views from different angles of the combination of the grating and the holder for the grating.
Figure 4:
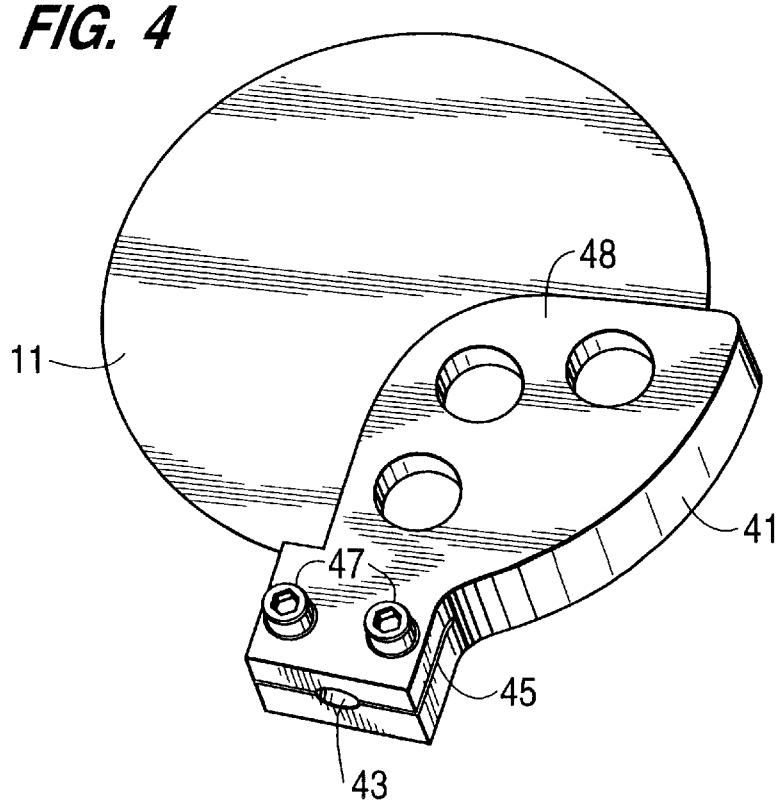

In accordance with the invention as shown in FIG. 2, the axis of the grating is shifted to a point further away from the exist slit to a lower position so that a narrow bandwidth of light passing through an exit in the exit slit is substantially focused at all angular positions of the grating. The axis of rotation is determined by locating the position of the grating at which the grating will focus light at a first position of the grating, locating a position of the grating at which the grating will focus light at another position substantially separated in wavelength from the first position, and then picking an axis which will rotate the grating between these two positions. The position of focus at a selected angular grating position is determined by adjusting the distance between the grating and the exit slit to that distance at which a minimum bandwidth is transmitted through the exit slit. In the example of FIG. 2, which is for a spherical grating having a radius of curvature of 192.4 millimeters, the grating is shown at two located positions at which the grating will focus dispersed light at the exit slit. In these two positions, the grating is pivoted at plus 31° and minus 11° relative to a reference line R, which is aligned with and perpendicular to the exit slit 23 as shown in FIG. 1. The center of the grating is located at a distance of 184.9 millimeters from the exit slit 23 and a distance of 206.9 millimeters (folded by mirror 19) from the entrance slit 17 when the grating is pivoted to its plus 31° degree position. Light passing through the entrance slit and reflected from the center of the mirror 29 will impinge on the grating 11 at an angle of 38° to the reference line R. In the first position, in which the grating is pivoted at plus 31°, the center of the spherical grating is positioned at point A. In this position, the center wavelength of the dispersed light passing through the exit slit is at 2500 nanometers. In the second position, in which the grating is pivoted at minus 11°, the center of the spherical surface of the grating will be at point B. In this position the center wavelength of the dispersed light passing through the exit slit is at 400 nanometers. To rotate the grating from point A to point B, the grating is pivoted on axis 29, to make the center of the grating surface shift from point A to point B on arc 31 and to pivot the grating from its angular position of plus 31° at point A to its angular position of minus 11° at point B. The axis 29 is located 9.0 millimeters below the reference line R and 4.0 millimeters behind a line perpendicular to the reference line R and passing through the point A. With the grating pivoted on axis 29, the dispersed light passing through the exit slit 23 will be substantially focused for the entire range from 2500 nanometer to 400 nanometers. This effect is shown by Table I below:

TABLE I

| wavelength in nanometers | bandwidth of prior art grating | bandwidth of grating of invention |
| --- | --- | --- |
| 945 | 15.49 | 10.17 |
| 1392 | 10.82 | 10.33 |
| 2290 | 9.82 | 10.44 |

By getting the light focused at the exit slit, a narrower bandwidth of light is transmitted through the exit slit. Table I shows the bandwidth at each of three center wavelengths, 945 nanometers, 1392 nanometers and 2290 nanometers. At these three wavelengths with the axis of rotation tangent to the center of the sphere of the grating surface, the bandwidth achieved is shown under the heading "bandwidth of prior art grating". The bandwidth achieved at each of the these wavelengths with the axis of rotation of the grating shifted as shown in FIG. 2 is shown under the heading "bandwidth of invention grating." The limit of the bandwidth is measured by the wavelengths at which the intensity drops to ½ the peak intensity. Thus, it is apparent that a bandwidth of just over ten nanometers is achieved by the system of the invention throughout the spectrum.

The shifting of the axis of the rotation of the grating would tend to move the axis of rotation off the center of gravity of the grating. At high rate of grating oscillation, this condition would tend to cause a wear in the bearings supporting the axle 14 by which the motor 13 drives and oscillates the grating 11. To avoid this problem, the grating 11 is mounted in a holder 41 which is provided with a bore 43 to engage and receive the axle 14. The holder 41 is provided with a slot 45 bisecting the bore 43 to define two plates on each side of the slot 47. Screws 47 are passed through bores in one of the two plates defining the slot 45 and are threaded into the other one of the plates to clamp the plates onto the axle 14 to firmly hold the grating in a fixed angular position on the axle 14. The bore 43 is positioned to locate the axis 29 on which the grating is rotated at the selected position as show in FIG. 2. The weight is distributed in the holder 41 so that the center of gravity of the combined structure of the grating 11 including its substrate, and the holder 41 is on the axis of the axle 14 and therefore is on the axis on which the grating 11 is oscillated. The holder 41 has a back portion 48 to engage the back of the grating 11 and a front plate 49 which is screwed onto the back portion 47 by screws 51 to define an arcuate slot to receive the rim of the grating 11. The plate 51 has an inwardly projecting tab 53 at its distal end relative to the bore 43 to engage a small part of the front surface grating to ensure that the grating is held in place as it oscillates.

The specific embodiment of the invention employs a spherical holographic grating, but any grating which focuses the dispersed light at the exit slit may be used. The specific technique of locating the axis to pivot the grating involves locating the grating position for focusing the dispersed light at the two extremes of the scanning range of the grating, but it will be apparent that the axis can be determined from any two focusing positions for widely separated wavelengths in the scanning range.

These and other modifications may be made to the above described invention without departing from the spirt and scope of the invention, which is defined in the appended claims.

We claim:

1. In a spectroscopic instrument having a pivoting focusing grating for dispersing light into a spectrum directed toward an exit slit so that a narrow bandwidth of dispersed light passes through said exit slit and so that the center wavelength of the light passing through said exit slit is scanned through at least a portion of said spectrum, the improvement wherein said grating is pivoted on axis spaced from the surface of said grating and wherein said axis is positioned so that said grating substantially focuses the light dispersed from said grating at said exit slit throughout said portion of said spectrum.

2. In a spectroscopic instrument as recited in claim 1 wherein said grating is mounted on an axle, centered on said axis and said grating is pivoted by a motor connected to drive said axle.

3. A spectroscopic instrument as recited in claim 1 wherein said grating is mounted in a holder and wherein said holder is constructed so that said holder and said grating combined have a center of gravity on said axis.

4. A spectroscopic instrument as recited in claim 3 wherein said holder is mounted on an axle centered on said axis and wherein a motor is provided to drive said axle to pivot said grating.

5. A spectroscopic instrument as recited in claim 1 wherein the axis is positioned to be further away from said exit slit than the surface of said grating.

6. A spectroscopic instrument as recited in claim 1 further comprising a light source to illuminate said grating through an entrance slit.

7. A spectroscopic instrument as recited in claim 1 wherein said grating is a holographic grating.

8. A spectroscopic instrument as recited in claim 1, wherein said axis is displaced from a line passing through the center of said surface of said grating perpendicular to said surface of said grating.

9. In a spectroscopic instrument having a pivoting focusing grating for dispersing incident light into a spectrum directed through an exit slit so that a narrow bandwidth of dispersed light passes through said exit slit and so that the center wavelength of said light passing through said exit slit is scanned through at least a predetermined portion of said spectrum, the improvement wherein said grating is positioned on an axis spaced from the surface of said grating in a position that will cause said grating to rotate from a first position in which said grating focuses the dispersed light passing through said exit slit at a first center wavelength at said exit slit to a second position in which said grating focuses the dispersed light passing through said exit slit at a second center wavelength at said exit slit.

10. A spectroscopic grating as recited in claim 9 wherein said grating is pivoted on said axis through a predetermined range and wherein said first and second center wavelengths pass through said exit slit when said grating is near the opposite ends of said predetermined range.

11. In a spectroscopic instrument as recited in claim 9 wherein said grating is mounted on an axle, centered on said axis and said grating is pivoted by a motor connected to drive said axle.

12. A spectroscopic instrument as recited in claim 9 wherein said grating is mounted in a holder and wherein said holder is constructed so that said holder and said grating combined have a center of gravity on said axis.

13. A spectroscopic instrument as recited in claim 12 wherein said holder is mounted on an axle centered on said axis and wherein a motor is provided to drive said axle to pivot said grating.

14. A spectroscopic instrument as recited in claim 9 wherein the axis is positioned to be further away from said exit slit than the surface of said grating.

15. A spectroscopic instrument as recited in claim 9 further comprising a light source to illuminate said grating through an entrance slit.

16. A spectroscopic instrument as recited in claim 9 wherein said grating is a holographic grating.

17. A spectroscopic instrument as recited in claim 9, wherein said axis is displaced from a line passing through the center of said surface of said grating perpendicular to said surface of said grating.

* * * * *